Dec. 16, 1969     C. G. MARTIN     3,484,038
LIQUID RING MECHANISM AND METHOD

Filed May 11, 1967     5 Sheets-Sheet 3

INVENTOR.
CECIL G. MARTIN
BY Watts, Hoffmann,
Fisher & Heinke
ATTORNEYS.

Dec. 16, 1969  C. G. MARTIN  3,484,038
LIQUID RING MECHANISM AND METHOD
Filed May 11, 1967  5 Sheets-Sheet 4
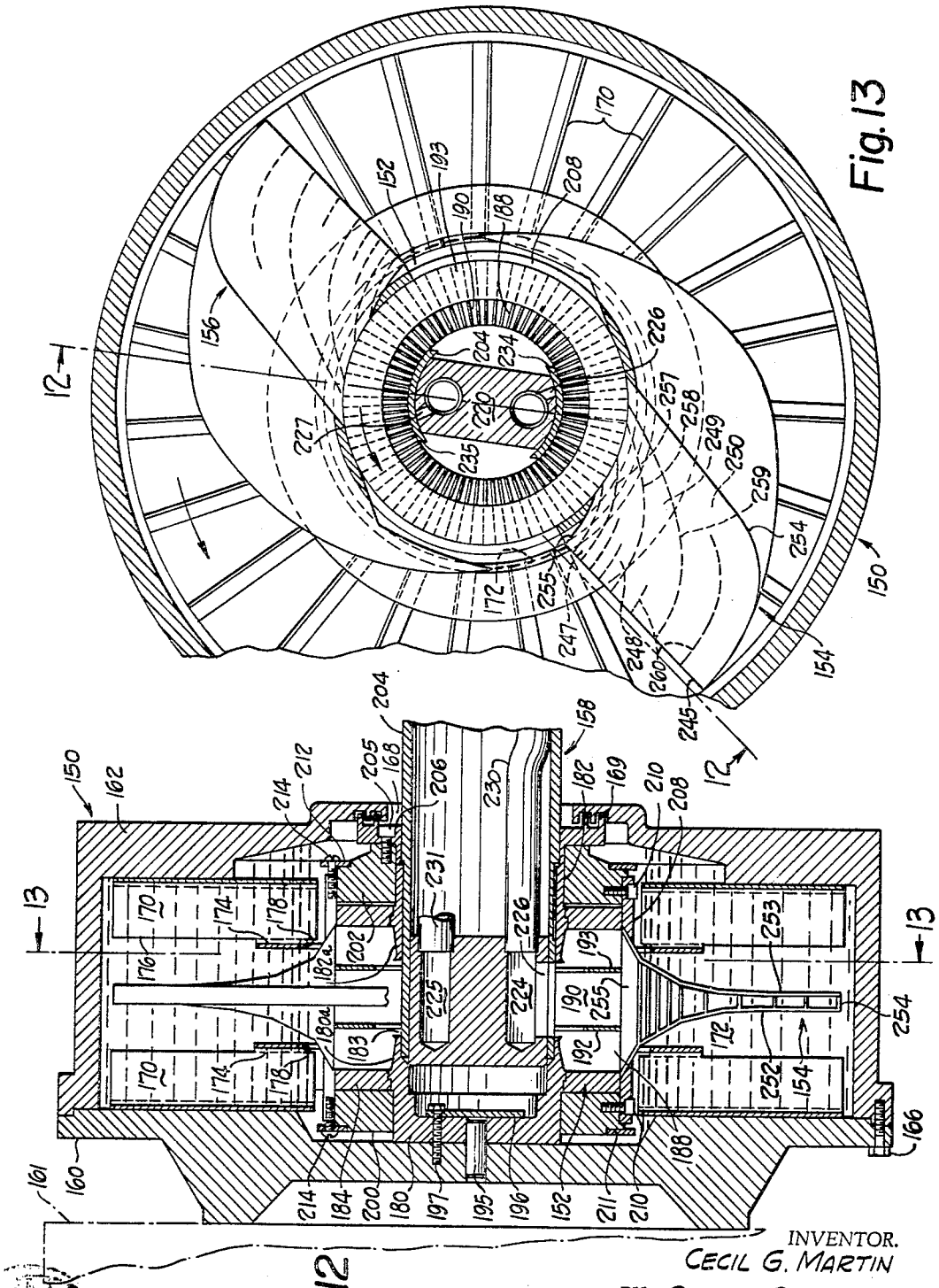
INVENTOR.
CECIL G. MARTIN
BY Watts, Hoffmann,
Fisher & Heinke
ATTORNEYS.

United States Patent Office 3,484,038
Patented Dec. 16, 1969

3,484,038
LIQUID RING MECHANISM AND METHOD
Cecil G. Martin, Cleveland, Ohio, assignor to Energy Technology, Inc., Cleveland, Ohio
Filed May 11, 1967, Ser. No. 637,745
Int. Cl. F04f *11/00;* F02g *1/00;* F02f *5/04*
U.S. Cl. 230—75
26 Claims

ABSTRACT OF THE DISCLOSURE

A circular casing containing a liquid ring and a concentric compression wheel within the casing are rotated in the same direction and at speeds such that the liquid ring has a greater peripheral velocity than the wheel. A fixed deflector directs liquid from the ring into cavities of the compression wheel and converts kinetic energy of the liquid into static pressure. Gas trapped in the cavities is compressed. The compressed gas can be delivered from the cavities under pressure or can be ignited if combustible and expanded to drive the casing.

BACKGROUND OF THE INVENTION

This invention relates to liquid ring mechanisms and more particularly to gas compressors of the liquid ring type.

There have been prior proposals for so-called liquid ring compressors or pumps. Some of these proposals, like the device of this invention, are applicable for use as vacuum pumps and expansion and internal combustion engines, as well as for use as compressors. Thus, it will be recognized that the principle incorporated can be used in many liquid ring mechanisms.

In the copending application of Cecil G. Martin and William E. Bartley III, Ser. No. 462,960, filed June 10, 1965, now Patent No. 3,395,854, and entitled "Compressor," an improved liquid ring mcehanism is disclosed that compresses gas primarily through the utilization of kinetic energy from a rotating liquid ring. By comparison, other liquid ring mechanisms compress gas through the utilization of a hydrostatic head; that is, by depressing trapped gas below the liquid level of a rotating liquid ring.

SUMMARY OF THE INVENTION

The present invention is directed to a liquid ring mechanism and methods that utilize the kinetic energy of a rotating liquid ring in an improved and more efficient manner than heretofore. Basically, in the preferred embodiments of the invention, a wheel having radial cavities opening through the perimeter of the wheel is rotated outside the boundary formed by the inner surface of a liquid ring rotating at a high peripheral velocity. The location of the wheel outside the liquid boundary ring eliminates energy loss between the wheel and liquid that is present in mechanisms in which the wheel enters the liquid ring. Liquid is deflected from the ring, the velocity of the deflected liquid is reduced, and the liquid is directed into the cavities of the wheel. The liquid traps gas within the cavities and the reduction in liquid velocity is used to create an increase in static pressure within the cavities to compress the trapped gas. The cavities are subsequently ported to a gas takeoff or the compresed gas is otherwise utilized.

Liquid is deflected with a fixed deflector extending into the liquid ring. The deflector is formed of arcuate conduits. The arcuate conduits expand in cross section from an inlet where they receive liquid from the ring to an outlet located radially inward from the inlet. As a result, the deflector functions as a mechanical diffuser and reduces the initially high velocity of the liquid from the ring, converting kinetic energy to static pressure. This deceleration also allows liquid to be transferred to wheel cavities of a compression wheel at a lower velocity than that of the ring, decreasing entrance losses in getting the liquid into the cavities, and permitting a wider range of operating conditions without penalties. In short, the construction and arrangement of the deflector makes possible the efficient utilization of the available energy of the ring. It is recognized that the deflected liquid and its available energy can be received and utilized in different ways for various purposes. The wheel cavities themselves can also be constructed as mehcanical diffusers to accomplish part of the desired conversion of kinetic energy to pressure.

By using a stationary deflector between the rotating casing and wheel, liquid direction is changed to deffect it into the cavities without taking energy from the liquid because the change is accomplished without movement of the deflector. This reduces the energy that must be put into the liquid ring to achieve the desired compression, as compared with liquid ring compressors where the liquid deflection (and the resultant force) takes place in a moving member. In addition, the tendency of a compression wheel in the liquid ring to slow the moving ring of liquid creates resistance and body-drag losses. These losses are minimized with a fixed deflector because the deflector takes all the liquid it intercepts and energy losses are essentially limited to losses due to skin friction between the walls of the deflector and the liquid.

An improved construciton of liquid ring mechanisms is made possible by deflecting liquid from the ring to cavities of a wheel positioned outside the liquid ring boundary formed by the inner surface. In a preferred embodiment of this invention, a compression wheel with peripheral cavities is located concentrically within a surrounding casing, which contains the liquid ring. This permits coupling the wheel and casing together as a unit for rotation at the same angular velocity about a common axis. The construction is thereby simplified and a single dive can be used, with the larger diameter of the casing providing a greater peripheral velocity of the liquid ring relative to the wheel. Because the fixed deflector changes the direction of liquid movement and directs it into moving cavities of the wheel, the wheel cavities can be constructed with straight radial walls while yet efficiently utilizing the liquid energy. Also, a plurality of deflectors can be used to scoop liquid from the ring at spaced locations, each cooperating with different portions of the compression wheel simultaneously. An increased volume output from a given mechanism is obtained in this way, and the dynamic and static forces balance of the mechanism is improved.

The combination of features referred to above not only provides increased efficiencies, but in so doing also provides high pressures and high volume outputs beyond those which are obtainable with known liquid ring devices. Also, increased ring velocities can be used to obtain an increase in pressure output, because kinetic energy utilized in this invention varies primarily with the difference between the square of the velocity of the liquid and the square of the velocity of the cavity in which the gas is being compressed.

Accordingly, it is an object of this invention to provide a novel and improved gas mechanism of the liquid ring type and a novel method of compressing gas.

This and other objects, features and advantages of this invention will become better understood by reference to the detailed descriptions of the preferred embodiments, when considered in conjunction with the accompanying drawings.

BRIEF DESCRIPTION OF DRAWINGS

FIGURE 9 is a longitudinal sectional view of the gas takeoff of FIGURE 8;

FIGURE 10 is a partial detail view, with parts broken away, showing the manner in which the wheel cavities cooperate with the scoop and gas takeoff of the compression;

FIGURE 12 is a sectional view of another embodiment of a compressor constructed in accordance with the present invention, taken along the line 12—12 of FIGURE 13 and looking in the direction of the arrows;

FIGURE 13 is a sectional view of the compressor of FIGURE 12 taken along the line 13—13 and looking in the direction of the arrows.

DESCRIPTION OF THE PREFERRED EMBODIMENTS

Figure 1:
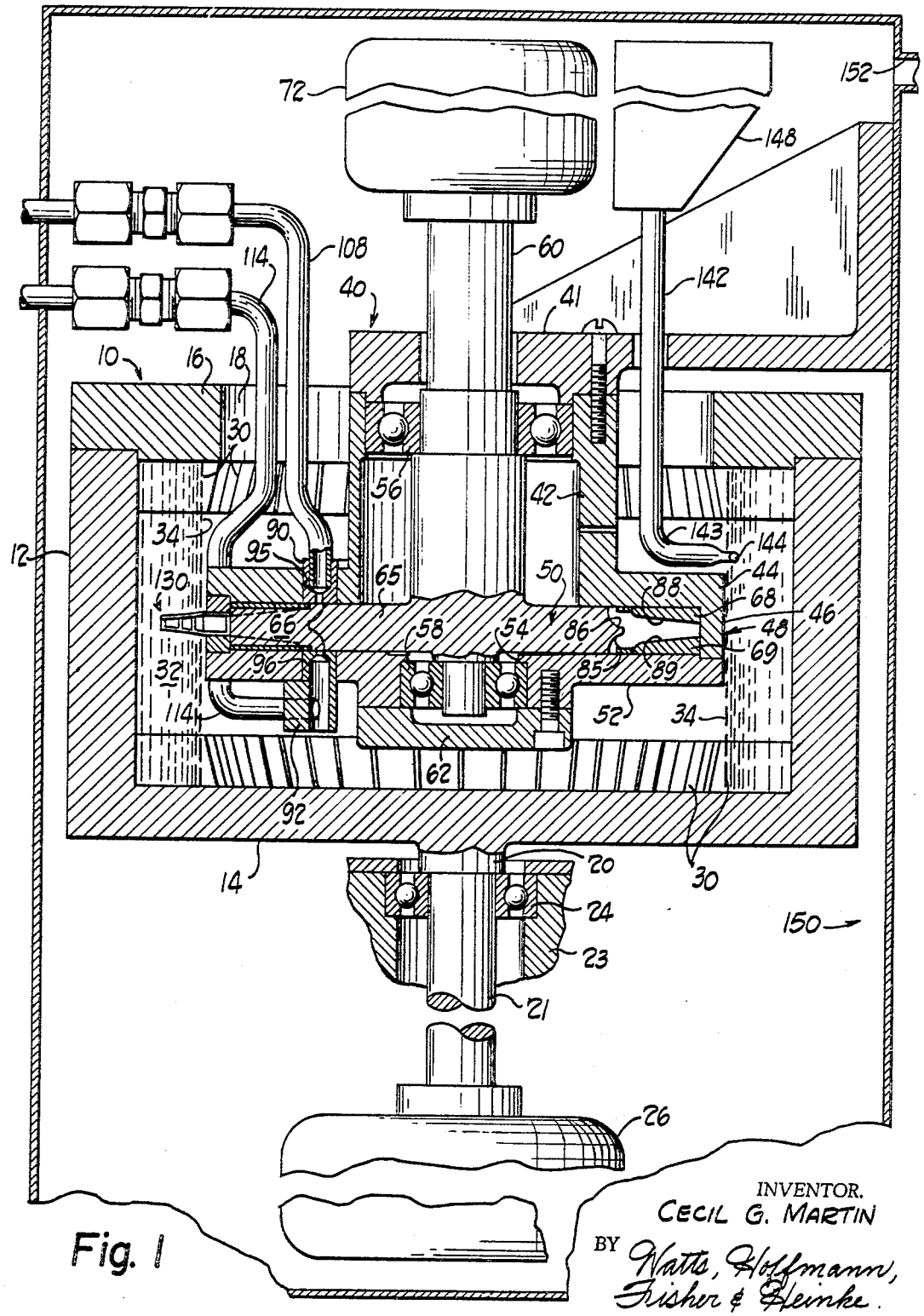
FIGURE 1 is a vertical, transverse sectional view of the compressor of the present invention, taken along the line 1—1 of FIGURE 2, and looking in the direction of the arrows.

Referring now to the drawings, a first embodiment of the compressor is shown in FIGURES 1 to 11. The main body of the compressor is in the form of a cylindrical casing 10. The casing is shown disposed for rotation about a vertical axis. The axis of rotation may, of course, be disposed otherwise. The casing 10 is comprised of a peripheral wall 12, which in the orientation shown, is upstanding. The wall 12 extends between spaced lower and upper radial walls 14, 16.

In the embodiment shown, the peripheral wall 12 and the lower radial wall 14 are integral. The upper radial wall 16 is secured to the peripheral wall 12 by threaded fasteners 17, shown in FIGURE 2. A central opening 18 of circular shape is provided in the upper radial wall 16. The opening 18 is generally centered with the vertical, central axis of the circular casing 10. A central boss 20 is located on the outside surface of the lower radial wall 14 of the circular casing 10, at the central axis.

A downwardly extending vertical shaft 21 is fixed to the circular casing 10 at the boss 20, as by screw threads or other suitable means. The shaft 21 supports the circular casing 10 in a fixed support 23 and rotates in a bearing 24. A prime mover, such as an electric motor 26, is connected to the vertical shaft 21 of the circular casing 10. The motor 26 rotates the shaft 21 and circular casing 10 about the central axis of the casing and shaft.

Figure 2:
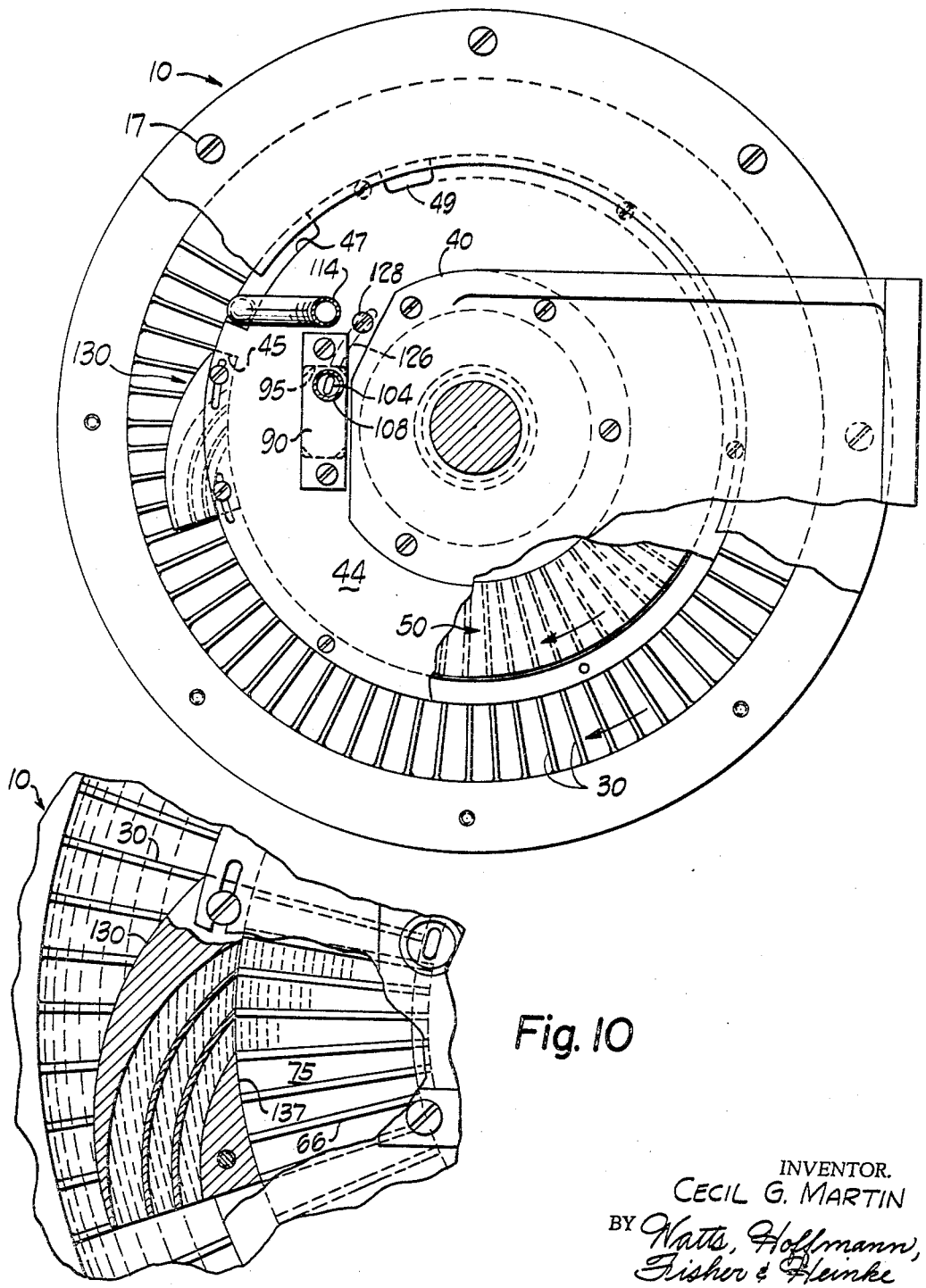
FIGURE 2 is a top plan view of the compressor of FIGURE 1, with parts in section and parts broken away to show the internal construction.

A plurality of radial vanes 30 extend from the inner surfaces of the lower and upper radial walls 14, 16. As best shown in FIGURES 1 and 2, the vanes terminate at one end with the peripheral wall 12 of the circular casing 10. They extend inward from the wall 12 to the circular opening 18 along the wall 16 and to a corresponding distance along the radial wall 14. As diagrammatically shown in FIGURE 1, a liquid ring 32 is formed within the casing 10 when the casing is rotated. An inner or upper surface 34 of the liquid ring 32 is shown at a level near the inner ends of the vanes 30.

A second fixed support 40 extends from above the circular casing 10 downward through the central opening 18 in the upper radial wall 16 of the casing. The fixed support 40 includes an upper support plate 41, a cylindrical portion 42 that extends through the central opening 18 of the casing, a radial flange 44 extending from the lower end of the cylindrical portion, and a peripheral wall that extends from the radial flange. The radial flange 44 and peripheral wall 46 form the upper portion of a housing 48 for a compression wheel 50. A circular housing cover 52 is secured to the lower end of the peripheral wall 46, and includes a central opening 54.

The peripheral wall 46 is provided with three peripherally spaced openings, most clearly shown in FIGURE 2 and indicated at 45, 47 and 49, to provide communication from outside the housing to the compression wheel 50. The openings 45 provide access to the compression wheel so liquid can be deflected into the cavities. The openings 47 and 49 allow liquid to escape from the cavities after gas has been compressed. Peripheral portions of the radial flange 44 and housing cover 52 are recessed adjacent the openings 47 and 49, as shown.

A bearing 56 is mounted in the upper portion of the fixed support 40, and a second bearing 58 is located in the opening 54 of the cover 52. A rotatable shaft 60 extends through the second fixed support 40 and is journaled in the bearings 56, 58. The shaft 60 extends vertically above the shaft 21 and along the same axis, coincident with the central axis of the casing 10. A bearing cap 62 is secured to the cover 52 over the opening 54, retaining the bearing 58 in place.

Figure 3:
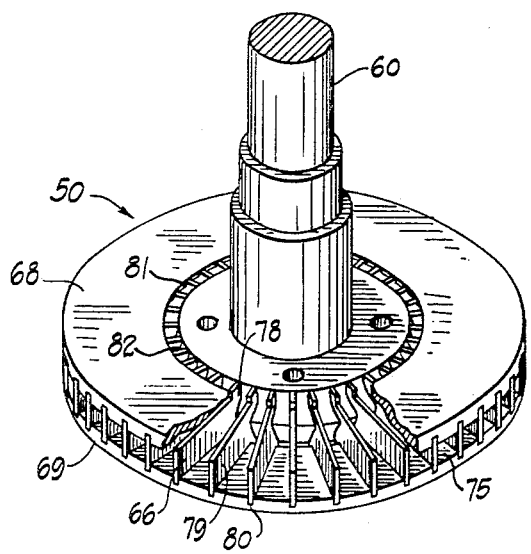
FIGURE 3 is a perspective view, in part broken away and with parts in section, of the compression wheel of the apparatus.

The compression wheel 50 is in part formed by a radial flange 65 at the lower end of the shaft 60, and in part by an assembly of radial vanes 66 and axially spaced annular walls 68, 69, best shown in FIGURE 3. The compression wheel is located within the housing 48 formed by the flange 44 and peripheral wall 46 of the second fixed support 40, together with the housing cover 52, and is located midway between the lower and upper radial walls 14, 16 of the casing 10. As best shown in FIGURE 1, the diameter of the compression wheel 50 is essentially equal to the inside diameter of the housing 48 so that the periphery of the wheel 50 is closely adjacent the inside surface of peripheral wall 46, but with sufficient clearance to permit rotation of the wheel. This spaces the periphery of the wheel 50 slightly inward from the surface 34 of the liquid ring 32.

A means of rotating and controlling the speed of rotation of the compression wheel 50, such as an electric motor 72, is fastened to the upper end of the shaft 60. Other means for controlling the rotation of the wheel 50 are also contemplated. For example, the wheel 50 can be directly driven in a predetermined relationship to the rotation of the casing 10 by a gear drive from the driving shaft 21 to the shaft 60, thereby obviating the need for the motor 72. In addition, the wheel and casing can be directly coupled for rotation at the same angular velocity for mechanical simplicity or may be driven at different velocities for maximum flexibility of operation.

As shown in FIGURE 3, the radial vanes 66 of the compression wheel 50 are flat and straight. They are connected with and extend from the radial flange 65 of the shaft 60 and, together with the annular side walls 68, 69, form cavities or compression chambers 75 that open through the periphery of the wheel 50. The side edges of the vanes 66 are stepped, so as to form a wider portion 78 at the inner end of each vane 66, where it joins the radial flange 65, and a narrower portion 79 that comprises a majority of the length of the vane and which is received in radial slots 80 of the inside surfaces of the annular walls 68, 69. With this construction, the outer surfaces of the annular walls 68, 69 are flush with the edges of the wider portions 78 of the vanes 66. An inside perimeter 81 of each annular wall 68, 69 abuts the wider portions 78 of the vanes and hence is spaced outwardly in a radial direction from the radial flange 65. This spacing forms an opening or porting passageway 82 to each cavity or compression chamber 75 on each side of the wheel 50. Thus, a ring of such openings is provided on opposite sides of the compression wheel at the inner ends of the cavities.

As best illustrated in FIGURE 1, the periphery of the radial flange 65 is not straight, but rather has a central peripheral ridge 84 that forms two smooth deflecting surfaces 85, 86 at the rear of each chamber 75. The deflecting surfaces direct a flow of gas from the chamber through the openings 82 when the compressor is operated.

The annular walls 68, 69 have inside surfaces 88, 89 contoured as shown in FIGURE 1 to increase the width of each chamber in a radially inward direction. This increase is sufficient to offset the decrease in cross sectional area otherwise occasioned by the convergence of the radial vanes 66. Furthermore, the surfaces 88, 89 can be contoured to provide a net increase in the cross sectional area of each chamber 75 so that the volume increases inwardly of the peripheral opening and the cavities act as mechanical diffusers converting kinetic energy to static pressure when liquid moves into the cavities to compress gas, in a manner to be described subsequently.

An upper gas takeoff 90 and a lower gas takeoff 92 are carried by and communicate through the wheel housing 48. The upper gas takeoff 90 is received in an opening 95 (see FIGURE 2), and the lower gas takeoff 92 is received in an opening 96 in the housing cover 52.

Figure 6:
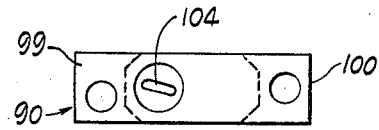
FIGURE 6 is a top plan view of the upper gas takeoff of the apparatus of FIGURE 1.
Figure 7:
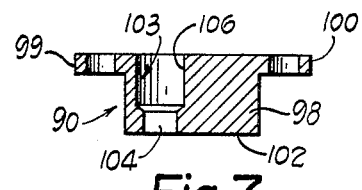
FIGURE 7 is a longitudinal sectional view of the gas takeoff of FIGURE 6.
Figure 8:
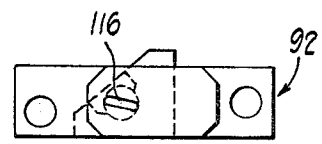
FIGURE 8 is a bottom plan view of the lower gas takeoff of the apparatus of FIGURE 1.
Figure 4:
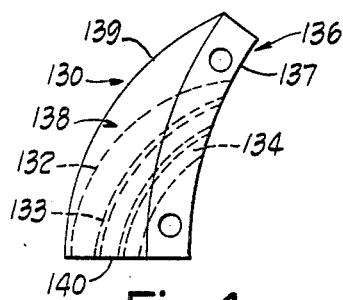
FIGURE 4 is a top plan view of the deflector used to scoop liquid from the liquid ring and direct it to the compression wheel, showing the details of construction.
Figure 5:
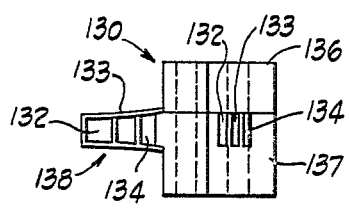
FIGURE 5 is an end elevation view of the deflector of FIGURE 4.

The construction of the upper gas takeoff 90 is shown in FIGURES 6 and 7. It includes a body portion 98 that is received in the opening 95, and extending ears 99, 100 that extend over and are secured to the radial flange 44 of the wheel housing 48. A lower surface 102 is located flush against the outer surface of the annular wall 68 and the upper surface of the radial flange 65 of the wheel 50, and overlies a portion of the ring of porting passageways 82. A passageway 103 extends through the body portion 98 and is formed of a cylindrical upper portion 106 and a slot-like lower portion 104 that opens through the bottom surface 102. The slot portion 104 is somewhat narrower than the width of the ring of openings 82 and is angularly disposed to extend along a small arcuate portion of the ring of openings. The length of the slot 104 is somewhat longer than the width of the openings 82 so as to lie across more than one opening at a time. The lower surface 102 of the upper gas takeoff 90, in conjunction with the opening 104, functions as a valve with the rotating compression wheel 50 to control the porting of the passageways 82 of the cavity 75. The circular portion 106 of the passageway 103 receives a discharge conduit 108 for conducting away gas compressed in the cavity 75 and discharged through the ports 82 and gas takeoff.

Similarly, the lower gas takeoff 92 includes a body portion 110 having mounting ears 111, 112. A depending portion 110a of the body portion 110 accommodates a discharge conduit 114. A passageway 115 extends through the body portion 110 and includes a slot portion 116 and a cylindrical portion 118. A lateral port 120 communicates with the cylindrical portion 118 and receives the discharge conduit 114. The slot portion 116 is oriented similarly to the slot portion 104 of the upper gas takeoff so as to be opposite openings 82 adjacent the housing cover 52. A flat upper surface 122 is located flush against the lower annular wall 69 and lower radial surface of the flange 65. This wall and the slot openings 115 cooperate with the compression wheel 50 to control the porting of the cavities or compression chambers 75 in the same manner as explained in connection with the upper gas takeoff 90.

As shown in FIGURE 2 in connection with the radial flange 44 of the housing 48 an arcuate venting groove 126 is formed on the inside surface of the flange to lie opposite the associated ring of porting passageways 82. The groove starts at one side of the opening 95 in the flange, at the upper gas takeoff 90, and extends a distance sufficient to overlie a plurality of passageways 82 of the cavities 75. An aperture 128 extends through the radial flange 44 and communicates with the venting groove 126. This groove and aperture connect cavities 75 with the atmosphere surrounding the compressor after they have moved beyond the gas takeoff 90. A similar groove and venting aperture are provided in the circular housing cover 52 and vent the openings 82 on the opposite side of the wheel 50.

A deflector 130 in the form of a curved scoop or cascade of three curved conduits or channels 132, 133, 134 is secured to the periphery of the housing 48 and extends radially therefrom in the general plane of the compression wheel 50.

The deflector 130 has a wide base portion 136 (FIGURES 4 and 5) that is arcuately formed and fits within the opening 45 in the peripheral wall 46 of the radial flange 44 of the wheel housing 48. An inner curved surface 137 conforms to the curvature of the periphery of the wheel 50 and is directly adjacent the openings to the cavities 75 that move past the deflector. See FIGURE 10. The deflector 130 also includes a narrow extending portion 138 that extends radially of the housing 48 in the general plane of the cavities. The radially extending portion 138 has a curved outer contour 139 at the back that substantially fills any wake created by the deflector in the liquid ring, and thereby reduces turbulence. The front end of the extending portion 138 terminates in a straight end surface 140, through which the three curved channels 132, 133, 134 open. The curved channels extend from the straight front end 140 to the curved inner surface 137 of the base portion. The narrow extending portion 138 is shaped so that the inlet openings to the channels are smaller than the outlets and the cross sectional area of each channel gradually increases toward the outlet. The outlets of the channels are of substantially equal size while the inlet openings are of different shapes and sizes. However, the channels are designed to pass substantially equal volumes of liquid during operation. Consistent with the above, the opening to channel 132 is narrower and deeper than the openings to channels 133 and 134, the channel 132 expands in cross sectional area to a greater extent than the other channels and it receives a higher velocity flow of liquid. The opening to channel 134 is wider and larger than the opening to channel 133, expands in cross section to a lesser extent and receives a lower velocity flow of liquid. This construction and arrangement of the deflector 130 controls the pressure created in the wheel cavities by the liquid, as will be explained in more detail subsequently. As best illustrated in FIGURES 1 and 2, only the narrow radially extending portion 138 extends beyond the periphery of the housing 48 and into the liquid ring 32. A preferred construction of a deflector will be described in more detail in connection with the embodiment of FIGURES 12 and 13.

The relationship in position between the curved conduits 132, 133, 134, the cavities 75, and the gas takeoffs 90, 96 is best illustrated in FIGURES 2 and 10. As shown, the conduits of the deflector 130 adjoin the openings of three successive cavities 75 just before the cavities reach the slot portions 104, 116 of the upper and lower gas takeoffs, respectively. The conduit outlets correspond in cross section to the opening into each cavity 75. Curved arrows in FIGURE 2 indicate the direction of rotation of the compression wheel and the casing. Thus, the solid surface portions 102 and 122 of the two gas takeoffs 90, 92 close the porting passageways 82 of the cavities 75 as the cavities move past the deflector 130. The porting passageways then move directly beneath the slot openings 104, 116 of the upper and lower gas takeoffs so that the cavities 75 communicate with the discharge conduits 108, 114. Immediately thereafter, the porting passageways 82 communicate with the grooves 126 in the housing 48, adjacent opposite sides of the compression wheel. The cavities communicate through these grooves with the apertures 128 and the surrounding atmosphere so that liquid in the cavities can be discharged as will be explained in more detail in connection with the operation.

As shown in FIGURE 1, a level control tube 142 extends through the central opening 18 in the circular casing 10. The lower end of the control tube 142 is curved as at 143 so that an open end 144 faces into the direction of rotation of the circular casing 10. The curved portion and open end 144 of the level control tube 142 are located above the radial flange 44 of the compression wheel housing 48. The entire tube can be moved radially of the casing 10 to change the location of the open end 144 relative to the peripheral wall 12 of the casing. A reservoir 148 for containing liquid of the liquid ring 32 is located directly above and in communication with the level control tube. A pressure balance is established between the moving liquid 32 in the casing 10 and the liquid in the reservoir 148 that maintains the liquid level in the casing at a depth determined by the location of the open end 144 of the tube 142. Movement of the open end 144 of the control tube 142 radially away from the peripheral wall 12 of the casing 10 will introduce more liquid to the ring 32 from the reservoir 148, and movement toward the wall 12 will remove liquid from ring to the reservoir 148.

For purposes of illustration, the above described apparatus is shown in FIGURE 1 housed within a hermetically sealed container 150 having an inlet 152. The discharge conduits 108, 114 and leads (not shown) to the motors 26 and 72 extend through sealed openings (not shown) in the wall of the container 150. Thus, gas can be introduced through the inlet 152, where it will be received within the rotating casing 10 and be compressed and dicharged through the passageways 108, 114.

Figure 11:
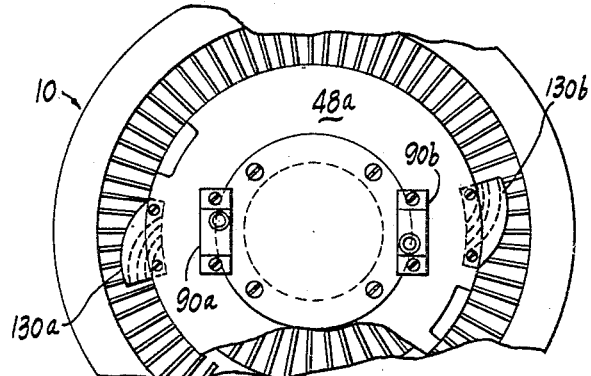
FIGURE 11 is a view similar to FIGURE 2, showing a modified compressor having two scoops or deflectors.

A modified apparatus is shown in FIGURE 11. This apparatus includes two reflectors or scoops 130a and 130b, each with separate gas takeoffs. A housing 44a is provided, modified to accommodate both deflectors. The arrangement for each deflector 130a, 130b is identical to that described for deflector 130. Gas takeoffs 90a, 90b and corresponding lower gas takeoffs communicate with a common conduit (not shown). Thus, for each revolution of the wheel 50 twice as much gas is compressed as in the embodiment with one deflector 130.

Another embodiment of a compressor constructed in accordance with this invention is shown in FIGURES 12 and 13 of the drawings. The compressor includes a cylindrical casing 150 supported for rotation about a horizontal axis in the orientation shown, a compression wheel 152 fixed within the casing 150 centrally thereof for rotation about the same axis, two fixed deflectors 154, 156 within the casing 150, and fixed central assembly 158 for carrying gas to and from the compression wheel.

The casing 150 is constructed of a radial wall 160, adapted to be secured to a drive means, such as the fly wheel of an engine shown in phantom at 161. A second radial wall 162 of the casing 150 is spaced from the first radial wall 160 by an integral peripheral wall 164. The peripheral wall 164 is secured to the first radial wall 160 by screws 166. A central circular opening 168 is formed in the second radial wall 162, providing a passageway through which the central fixed support 158 extends. A labyrinth seal 169 is provided between the wall 162 and the fixed support 158 at the opening 168. There is little pressure differential at this location and the seal 169 substantially isolates the inside of the casing 150 from the surrounding atmosphere.

A plurality of radial vanes 170 extend inwardly from the radial walls 160, 162 and serve to couple a ring of liquid, indicated by reference numeral 172, to the casing 150 during rotation of the casing. The radial vanes 170 extend substantially the entire distance between the peripheral wall 164 of the casing and the periphery of the compression wheel 152. An annular wall 174 is secured to inner radially extending edges 176 of the radial vanes on each radial wall of the casing. The annular walls 174 are located so that inner circular edges 178 are slightly below but adjacent to the surface of the liquid ring 172 that is formed when the casing 150 is rotated. The location of the annular walls 174 with respect to the liquid ring level limits the amplitude of harmonic waves that tend to be formed in the rotating liquid ring.

The compression wheel 152 is constructed with a two part hub consisting of an inboard hub 180 and outboard hub 182 spaced from each other to form a central annular opening 183 in the wheel 152. Spaced, circular, wheel side plates 184, 185 extend from the inboard and outboard hubs, respectively. A plurality of spaced radial blades 188 extend between the two wheel side plates 184, 185 from the hubs 180, 182 to the outer periphery of the side plates. This structure defines a plurality of radial compression chambers 190. Two annular blade supports 192, 193 are located between the side plates 184, 185 to aid in structurally supporting the radial blades 188.

The wheel 152 is located with respect to the casing 150 by a piloting pin 195 that extends through the central axis of the radial plate 160 and the inboard hub 180. The piloting pin 195 is covered on the inside of the wheel by a cover plate 196, and a plurality of bolts 197 secure the cover plate, inboard hub and radial plate 160 together.

Front and rear journal bearings 200, 202 encircle the inboard and outboard journals 180, 182, respectively and a fixed tubular member 204 extends centrally within the hubs and through the central circular opening 168 of the casing. The front and rear bearings are supported by the journals and the rear bearing 202 is directly secured against rotation by screws 205 from a radial flange 206 fixed to the tubular member 204. The front and rear bearings 200, 202 serve to support a deflector support ring 208 that incircles the wheel 152 and which supports the deflectors 154, 156. The support ring 208 also secures the front and rear bearings together, being held in place by screws 201 that extend through the deflector support block and into the front and rear bearing supports. In addition, two clamp rings 211, 212 are recessed about the periphery of the front and rear bearing supports, and are secured by screws 214 to the sides of the deflector support ring 208. The support ring 208 is an essentially open affair, with portions extending across the width of the wheel 152 adjacent the deflectors to support and hold the deflectors in place. Large openings in the ring accommodate the inner end of each deflector and additional open areas 209 (FIGURE 13) between the deflectors allow liquid to escape from the cavities 190 after the cavities move past the deflectors.

A gas takeoff 220 is located within the tubular member 204, centrally of the compression wheel 152. The gas takeoff 220 includes two bores 224, 225 spaced diametrically across the tubular member 204. Two slot shaped passageways 226, 227, extend from the bores through the tubular support member 204. The length of the slots 226, 227 axially of the tubular member 204 corresponds to the width of the annular opening 183 formed between extensions 180a, 182a of the inboard and outboard 180, 182 of the compression wheel. The peripheral width of the slots 226, 227 corresponds to the width of approximately two cavities 190 at the hub of the compression wheel so that cavities 190 will successively communicate with the two bores 224, 225 of the gas take-off as the wheel is rotated. The slots 226, 227 are located to communicate with wheel cavities 190 just before the cavities complete their motion past the discharge of a deflector 154, 156. Conduits 230, 231 extend from the bores through the tubular support member 204 and carry compressed gas from the wheel 152. While a cavity is moved past a deflector 154, 156, the opening 183 between the journal extensions is closed by the surface of the fixed tubular member 204.

As best shown in FIGURE 13, the tubular member 204 is open at 234, 235 at each side of the gas takeoff 220, opposite the annular opening 183. The open portions 234, 235 and the fact that the gas takeoff is narrower than the central opening of the tubular member 204 provide passage for gas from the tubular member 204 to the center of the wheel 152. With this arrangement, as soon as the cavities move past the slots 226, 227 of the gas takeoff they are vented at their inner ends to the atmosphere within the tubular member. As a result, liquid in the cavities is returned to the ring by centrifugal force as the cavities 190 move past the open portions 234, 235 and past open areas 209 in the support ring 208. At this time, gas to be compressed, which is supplied through the tubular member 204, fills the cavities 190 through the annular opening 183 between the hubs.

The two deflectors 154, 156 are supported by the deflector support ring 208. As best shown in FIGURE 13, the two deflectors are diametrically opposite from each other and are identical in construction. Both extend into the liquid ring 172, receive liquid through an open front inlet 245, and deliver the liquid to the compression wheel through an outlet 246. Each deflector is shaped to provide a gradual increase in cross sectional area from the inlet to the outlet, and thereby functions as a mechanical diffuser and decelerates the liquid deflected from the ring 172. Only the deflector 154 will be described in detail.

Four channels or conduits 247, 248, 249, 250 are formed between side walls 252, 253, a lower and back wall 254 and a top wall 255 that form the deflector. These channels are defined by divider walls 257, 258, 259. In addition, one or more vanes 260 extend within each channel to minimize the turbulence of liquid flow through the channel.

As best shown in FIGURE 12, the deflector is narrow at the end farthest from the compression wheel and becomes wider close to the compression wheel, so that the width at the outlet end 246 corresponds with the width of the cavities 190 of the compression wheel. Each channel 247-250 extends from the front inlet 245, which extends in a plane generally radial of the compression wheel 152, and curves toward the periphery of the compression wheel. The conduits 247-250 do not curve to an extent that they direct a flow of liquid radially of the compresions wheel. Rather, they curve to a lesser degree so that liquid deflected toward the cavities of the compression wheel has a forward component of movement in the direction of rotation of the compression wheel. Within the contemplated range of operating speeds of the wheel, the angle at which the channels introduce liquid to the cavities 190 establishes a forward component of motion substantially equal to the peripheral velocity of the compression wheel so that the transfer of liquid to the wheel cavities is with a minimum of turbulence.

For high efficiency, the portion of the deflector that enters the liquid ring is kept small relative to the liquid ring cross section. This minimizes turbulence and energy losses that would otherwise be caused by undue acceleration of liquid not intercepted by the deflector. It also assures an adequate volume of moving liquid for subsequent compression of gas. The severity of turbulence and energy loss is generally a function of the proportion of liquid intercepted. To limit such losses the deflector is constructed to intercept no more than about 80 percent of the liquid ring cross section. The intercepted area is especially kept small at the deepest portions of the liquid ring where the velocities are greatest.

Relative to the rotation of the compresion wsehel 152, the channel 247 first introduces liquid into any given cavity 190. Thereafter, the conduits 248, 249 and 250 successfully introduce additional liquid to the cavity 190 under progressively greater pressure as the compression wheel rotates past the outlet end 246 of the deflector.

It will be appreciated that the liquid deepest in the liquid ring 172 moves at the greatest peripheral velocity and is at the greatest pressure when the casing 150 is rotated, whereas the liquid at the surface moves at the slowest velocity and exerts a lower static pressure. Each deflector is constructed to utilize the different amounts of energy at different levels in the liquid ring while supplying a desired volume of liquid to the cavities of the compression wheel. The precise shape and size of the deflector as well as the depth and velocity of the liquid ring control the output pressure.

The inlets to the channels 247-250 are arranged to extend into the liquid ring 172 at different depths. In addition, the channels extending deepest into the liquid ring are narrow and deep at the inlet end to extend deeply into the liquid where pressure and velocity are the greatest. They also increase in cross sectional area toward the upper outlet to a greater extent than the channels intercepting shallower portions of the liquid ring to provide a greater degree of deceleration, which is needed. The cross sectional area of the inlets to the channels 247-250 are constructed so that each channel will supply liquid from the ring to the cavities 190 at substantially the same rate as the other channels.

An arcuate member 262 extends from the bottom and back wall 254 of the deflector, gradually curving from the depth of the deflector to the surface of the liquid ring. This member acts as a wake filler to minimize any turbulence caused by the presence by the deflector in the moving ring of liquid 172.

To obtain a desired output pressure and volume of gas with this compressor, incremental pressures are developed within the cavities 190 as they progressively move past the outlets of the channels 247-250. This is done by successively introducing a predetermined volume of liquid into each cavity from each channel so that a desired pressure is attained when the cavity reaches the outlet port 226. The total volume of liquid introduced to the cavity will determine the resultant pressure. The depth to which each channel 247-250 is located within the liquid ring is selected to obtain the amount of energy needed to progressively introduce the required volume of liquid in the cavities. Kinetic energy of the liquid is converted to static pressure through deceleration of the liquid as controlled by the expansion in cross sectional area of the channels so that a total pressure is delivered at the wheel periphery by each channel to match the gas compression pressure desired plus an added increment of pressure to overcome liquid back pressure from centrifugal force created by the rotating compression wheel.

To obtain a large portion of the available kinetic energy of the liquid ring in an efficient manner, the cross section of the most deeply submerged deflector channels 250 are typically increased to reduce the average velocity of the deflected liquid within the deepest channels by a factor of about three times or more. It is these deepest channels that provide the most significant contribution of kinetic energy and the increase in cross sectional area reduces the kinetic energy of the deflected liquid to one-ninth or less of the initial kinetic energy, with eight-ninths or more being converted into static pressure.

Figure 14:
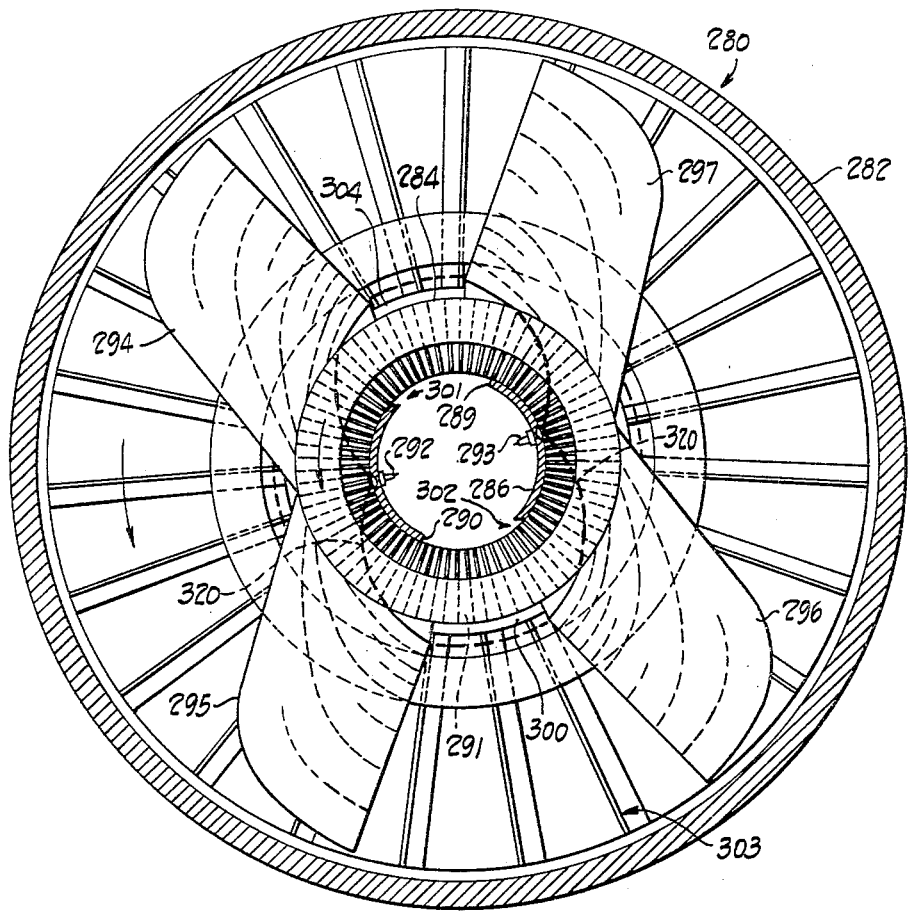
FIGURE 14 is a sectional view similar to FIGURE 13 of another embodiment of this invention, showing the construction of an internal combustion engine.

As shown in FIGURE 14, the present invention includes as an embodiment a rotary internal combustion engine, indicated generally at 280. The engine 280 includes a circular casing 282 and a chambered wheel 284, which are constructed the same as the casing 150 and wheel 152 of the embodiment shown in FIGURES 12 and 13, and connected to rotate together.

The wheel 284 rotates about a central member 286. two diametrically opposite opening portions 289, 290 are provided in the tubular member at an axial location aligned with the wheel 284 and communicating with inner openings of peripheral chambers 291 of the wheel. Two igniters 292, 293 are supported by the tubular member 286 diametrically opposite each other between the openings 289, 290 and communicate with the open inner ends of the chambers 291.

Four deflectors 294, 295, 296, 297 are supported by a deflector support ring 300 that encircles the periphery of the wheel 284. The deflectors are constructed indentically to the deflectors 154, 156 previously described. The deflectors 294, 195 function as a pair, as do the deflectors 296, 297. A deflector 294, 296 of each pair receives liquid from a liquid ring 320 carrier by the casing 282 and introduces it to the chambers 291 to compress an air-fuel mixture introduced from the tubular member 286 to the chambers through the openings 289, 290 of the tubular member. The fuel would typically be injected from tubular conduits (not shown) at points 301, 302 just prior to beginning of compression.

The other deflectors 295, 297 of each pair deliver liquid from the wheel chambers back to the casing after the compressed fuel mixture has been ignited to drive liquid out of the chamber 291. As shown in FIGURE 14, the igniters 292, 293 are located to communicate with each wheel chamber 291 after each chamber moves beyond a liquid receiving deflector 294, 296 and into communication with a liquid delivery deflector 295, 297. The high pressure of combustion drives the liquid from the deflectors 295, 297 at higher velocity than the casing 282, so that coupling vanes 303 of the casing 282 will absorb energy to drive the casing. The open portions 289, 290 of the tubular member 286 are located to communicate only with wheel chambers 291 that are between the two pairs of deflectors and the inner openings of the chambers 291 are sealed closed during the period when the outer ends of the chambers communicate with the deflectors. The combustion exhaust products are expelled by the centrigugal force of the wheel 284 into the annular clearance 304 between the inner surface of the liquid ring 320 and the wheel. As the exhaust products leave, they are replaced with a fresh charge of air flowing in through the openings 289, 290.

The operation of the disclosed embodiments, insofar as the compression of gas is concerned, is basically the same and therefore this aspect of the operation will be summarized in detail only in connection with the compressor of FIGURES 12 and 13. In operation, liquid, such as water, is placed within the circular casing 150. The casing 150 and compression wheel 152 are rotated together about the common central axis of the two, causing the liquid within the casing to form a ring of liquid 172 within the casing. The quantity of liquid used establishes a ring of liquid depth that extends just beyond the inner circular edges 178 of the annular walls 174. The liquid at this depth covers the inlets to the channels 247–250 at the front inlet 245 of the deflectors 154, 156. At this level, the inner surface of the liquid ring 172 is adjacent to but spaced from the periphery of the compression wheel 152. The linear velocity of the liquid is greater than the linear velocity of the perimeter of the compression wheel because the ring radius is greater than that of the wheel and the angular velocities are equal.

The radial vanes 170 on the walls of the casing 150 put energy into the liquid as the casing 150 is rotated and provide an efficient coupling between the liquid and the casing. This maintains hydraulic losses low and efficiently replenishes energy that is lost by both the liquid flowing past the deflectors 154, 156 and the liquid entering the deflectors that is used in compressing gas. In addition, the coupling maintains a velocity profile in the liquid approximating rigid body rotation. This also reduces hydraulic losses.

Gas to be compressed is introduced to the compressor through the tubular support 204 and enters the cavities 190 of the compression wheel through the annular opening 183 between the journals 180, 182 as the cavities pass by inlet or venting openings 234, 235.

As the casing 150, the liquid ring 172, and the compression wheel 152 are rotated, liquid from the ring is intercepted by the channels or conduits 247–250 of the deflectors. The liquid is scooped or deflected from the ring and conducted toward the periphery of the compression wheel 152 and into the cavities 190 as they move past the outlet 246 of each deflector. Since each deflector is stationary and accepts essentially all of the liquid it interrupts, energy losses are limited, primarily to those caused by skin friction between the walls of the deflector and the liquid.

The velocity of the liquid deflected from the liquid ring is substantially reduced by the increased cross sectional area of the channels of the deflectors. As a result, kinetic energy of the moving liquid is converted to static pressure. Substantial static pressure is also contributed by the liquid of the ring due to the substantial depth to which the deflectors are submerged in the liquid ring. A tangential or peripheral component of movement is established in the liquid entering the compression chambers or cavities 190 from the different channels that is substantially equal to the peripheral velocity of the compression wheel 152. This is achieved by the angular relationships of the channels 247–250 with the compression wheel at the outlet of the deflector and by the greater deceleration of liquid in the channels carrying the faster flows.

As cavities 190 filled with gas are rotated past the outlet 246 of each deflector, liquid directed by the deflectors into the cavities traps gas within the cavities. As the compression wheel rotates a plurality of the cavities successively receive additional liquid and the volume of gas within several cavities is concurrently, gradually and progressively diminished by the inflow of liquid. This inflow of liquid compresses the gas, which cannot escape. Centrifugal force acting on the liquid introduced through the peripheral openings of the cavities keeps the liquid and gas separated, maintaining a defined interface for efficient compression of the gas by the liquid. The progressively greater pressure provided by each successive channel 247–250 establishes a desirable progressive compression of gas within the cavities until the cavities reach the venting passageway 226 or 227. When the desired compression in the cavities is completed, the cavities communicate through the annular opening 183 in the hub of the compression wheel with the porting passageways 226, 227. The compressed gas is then carried away by the conduits 230, 231. A much higher efficiency is obtained in this way as compared with merely compressing the gas against the back pressure at the gas takeoff.

Further rotation of the compression wheel 152 communicates the inner openings of the cavities with the venting openings 238, 239 of the tubular support member 204. This permits liquid within the cavities to escape back to the liquid ring and at the same time additional gas to be compressed is introduced through the tubular member 204 and into the cavities 190. The cavities are vented almost immediately after they pass the gas takeoff so that liquid is not carried by the compression wheel any longer than necessary so that the cavities are in condition to compress additional gas as they move to the next deflector.

In the embodiment of FIGURES 1 to 11, the cavities 75 of the compression wheel 50 can be shaped to provide a slight increase in cross sectional area from the opening at the perimeter of the compression wheel toward the deflecting surface 85, 86 at the back of each cavity. Each cavity can therefore function to some degree as an expander or mechanical diffuser to further change the kinetic energy of the moving liquid into a static pressure head as the liquid flows into each cavity. Thus, during operation, kinetic energy can be converted to static pressure in both the deflector and in the cavities themselves.

In either embodiment it is preferred that most if not substantially all of the velocity decrease of the liquid from the liquid ring take place in the deflector itself. This minimizes the entrance velocity of the liquid into the cavities and helps maintain a stable interface between the liquid and gas in the cavities. In particular, by decelerating the liquid in the deflector and closely matching the forward component of liquid movement with the peripheral velocity of the compression wheel, any tendency of the incoming liquid to climb up the other the cavity at a greater rate than it moves up the other walls is minimized.

The embodiment of FIGURES 1 to 11 structurally provides flexibility in operation because the outer casing can be rotated at the same or at a faster angular velocity than the compression wheel. Thus, the peripheral velocity of the liquid is not merely dependent upon the difference in diameter in the casing as compared with the compression wheel. On the other hand, the embodiment of FIGURES 12 and 13 with relatively fixed compression wheel and casing provides advantages mechanically with respect to bearing construction and machining tolerances. Also, with fewer relatively moving parts, energy losses are minimized. Diameters of the wheel and casing and construction of the deflector can be varied to establish different velocities of the liquid to change the operating characteristics.

In the engine 280 shown in FIGURE 14, operation is started by rotating the casing 280. Liquid within the casing forms a liquid ring and liquid from the ring is deflected into the wheel chambers 291 by the deflectors 294, 296 in the manner deescribed in connection with the compressor of FIGURES 12 and 13.

A fuel mixture, such as natural gas and air is introduced to the chambers through the tubular member 286 and openings 289, 290 at locations 301, 302. Once a chamber receives fuel and moves into communication with a deflector 294, 296, the inner opening 290 is closed by the tubular member. The fuel is compressed as liquid is delivered to the chambers 291.

The compressed fuel in each chamber 291 is ignited by the igniters 292, 293 as each chamber moves into communication with a liquid delivery deflector 295, 297. The fuel burns, expands, and forces liquid from the chambers 291 into the deflectors 295, 297, and then through the deflectors and into the liquid ring. The construction of the deflectors 295, 297 causes the liquid to accelerate because the direction of liquid movement is from the wheel to the casing and the cross sectional area of the deflectors decreases in this direction. Accordingly, the pressure or static energy created by the ignition and expansion of the fuel is converted to kinetic energy and liquid is expelled at a high velocity into the liquid ring of the casing. This drives the casing 282 through the coupling vanes 303. The casing serves in this instance as a power takeoff rather than a power input. Any remaining exhaust products in the wheel cavities are expelled by centrifugal force as soon as the wheel cavities rotate past the deflectors 295, 297.

Other variations of the present invention are also contemplated. For example, the compressor can be used for handling refrigerants or fuels. In some of these instances the liquid ring and the gas being comnpressed can be comprised of the same substance, in liquid and vapor states, respectively.

What is claimed is:

1. In a method of compressing gas with a liquid, the steps comprising:
   (a) rotating a ring of liquid to establish a higher linear velocity relative to a cavity or chamber that is located outside the boundaries of the ring and radially inward thereof,
   (b) diverting liquid moving at said higher linear velocity from the ring through a channel and into the cavity through an open portion of the cavity nearest the liquid ring,
   (c) trapping gas in the cavity with diverted liquid,
   (d) advancing diverted liquid within the cavity in a radially inward direction in opposition to the trapped gas to compress the gas, and
   (e) discharging the compressed gas from the cavity at a location radially inward from the said open portion of the cavity nearest the liquid ring.

2. The method of claim 1 including the step of decelerating the diverted liquid prior to its introduction to the cavity.

3. In a method of compressing gas with a liquid, the steps comprising:
   (a) establishing a rotating liquid ring,
   (b) moving a cavity containing gas in a circular path concentric with the liquid ring, outside the boundaries of the ring, radially inward thereof, and at a lower linear velocity than the ring,
   (c) diverting portions of the liquid forming the ring through a channel and into the cavity through an open portion of the cavity nearest the liquid ring,
   (d) collecting a diverted portion of the liquid in the cavity in a manner to trap gas within the cavity,
   (e) advancing the diverted portion of the liquid within the cavity in a radially inward direction in opposition to the trapped gas to compress the gas, and
   (f) discharging the compressed gas from the cavity at a location radially inward from the said open portion of the cavity nearest the liquid ring.

4. In a method of compressing gas with a liquid, the steps comprising:
   (a) establishing a rotating liquid ring,
   (b) moving a cavity containing gas and located outside the boundaries of the liquid ring in a circular path encircled by and concentric with the liquid ring, and at a lower linear velocity than the liquid ring,
   (c) diverting portions of the liquid forming the ring through a channel toward the cavity,
   (d) decelerating diverted portions of the liquid in the channel to convert kinetic energy to static pressure,
   (e) collecting a diverted and decelerated portion of the liquid in the cavity through an open portion thereof nearest the liquid ring,
   (f) advancing said portion of the collected liquid within the cavity in a radially inward direction to exert a compressive force radially inward upon gas contained in the cavity, and
   (g) dishcarging compressed gas from the cavity at a location radially inward from the said open portion of the cavity nearest the liquid ring.

5. The method of claim 4 wherein a portion of the liquid forming the ring is diverted at a fixed location past which the rotating liquid ring moves, and including the step of moving a plurality of of successive cavities past the fixed location to successively collect diverted portions of the liquid and thereby continually compress gas.

6. In a method of compressing gas with a liquid, the steps comprising:
   (a) forming a rotating ring of liquid having an inner surface,
   (b) positioning a wheel to be encircled by the ring, with at least a portion of the periphery of the wheel adjacent to the surface of the liquid ring and with the entire wheel out side the boundaries of the ring, said wheel being comprised of a plurality of peripheral cavities open at the periphery of the wheel and with second openings in the cavities spaced from the periphery of the wheel,
   (c) rotating the wheel in the same direction as the liquid ring,
   (d) moving the liquid ring at a linear velocity greater than the linear velocity of the wheel periphery,
   (e) diverting moving liquid from the rotating liquid ring and directing diverted liquid into cavities of the wheel through the peripheral openings of the cavities, and (f) decelerating diverted liquid as it is directed to the cavities.

7. The method of claim 6 including the step of controlling the escape of gas from the cavities through the second openings so that gas within the cavities is first compressed by the liquid diverted from the liquid ring and then discharged through the second openings.

8. The method of claim 6 including the step of diverting the liquid into a plurality of cavities simultaneously and at different pressures.

9. The method of claim 8 wherein the liquid is diverted at a plurality of locations spaced peripherally about the liquid ring.

10. In a method of compressing gas with a liquid, the steps comprising:
(a) establishing a rotating ring of liquid having a depth between an inner surface and an outer periphery,
(b) diverting separate flows of liquid from the rotating ring at different depths in the ring at fixed locations past which the ring moves,
(c) decelerating the flows of liquid diverted,
(d) moving chambers containing gas relative to the said fixed locations and outside the boundaries of the liquid ring, and
(e) introducing decelerated liquid from the separate flows into cavities or chambers spaced from the ring and containing gas to be compressed, said liquid being introduced into any one cavity first from a flow diverted from a shallow depth and thereafter from a flow diverted from a greater depth.

11. The method of claim 10 wherein the chambers are moved in a circular path concentric with and encircled by the rotating ring, the liquid is introduced to the cavities radially of the circular path, and including the steps of rotating the ring in the same direction as the chambers at a linear velocity greater than the linear velocity of the chambers.

12. The method of claim 11 wherein the liquid ring and chamber are moved at the same angular velocity.

13. In a liquid ring mechanism, the combination of:
(a) a rotatable casing for containing a liquid in the form of a ring during rotation of the casing;
(b) a rotatable wheel within the casing, said wheel having a plurality of compression cavities opening through the perimeter of the wheel;
(c) a deflector within the casing, adjacent the wheel perimeter communicating between cavity openings at the wheel perimeter and a location within the casing radially outward from the wheel; and
(d) means supporting the deflector in a fixed position within the casing so that the casing and wheel move relative thereto.

14. The mechanism of claim 13 wherein the casing is circular, includes inwardly extending radial vanes, the casing and wheel are concentric, and including means to rotate the casing and wheel.

15. Apparatus for compressing gas, which comprises:
(a) a rotatable casing for containing a liquid in the form of a ring during rotation of the casing;
(b) a rotatable wheel within the casing, said wheel having a plurality of compression cavities opening through the perimeter of the wheel and means for porting compressed gas from the cavities;
(c) a deflector within the casing adjacent the wheel perimeter providing a conduit for diverting liquid in the casing and having an inlet remote from the wheel and an outlet proximate to the perimeter of the wheel, said deflector being shaped with a plurality of separate channels between the inlet and outlet and with an increase in cross sectional area between the inlet and the outlet; and
(d) means supporting the deflector in a fixed position within the chamber so that the casing and wheel move relative thereto.

16. The apparatus of claim 15 wherein the casing and wheel are concentric and connected to rotate together at the same angular velocity, and including a second deflector of similar construction and arrangement to the first, positioned substantially diametrically across the wheel from the first deflector.

17. The apparatus of claim 15 wherein the means for porting compressed gas from the cavities include second openings in the cavities spaced from the perimeter of the wheel, and further including means in a fixed position relative to the deflector for blocking said second openings during a portion of the rotation of the wheel and for providing an outlet in communication with said second opening during a portion of the rotation of the wheel, and means to connect the second openings to a source of gas to be compressed during a portion of the rotation of the wheel.

18. In a liquid ring mechanism, the combination of:
(a) a circular casing constructed and arranged to rotate about a central axis in one direction of rotation;
(b) a compression wheel positioned within the casing and constructed and arranged to rotate about a central axis in the same direction of rotation as the casing;
(c) cavities within the wheel opening through the perimeter thereof;
(d) a conduit supported within the casing fixed relative to the central axes of the casing and the wheel, extending radially outward from adjacent the perimeter of the wheel, and past which the casing and wheel rotate, said conduit (i) having one end oriented peripherally at the perimeter of the wheel and arranged to directly communicate with cavities of the wheel through the openings in the perimeter of the wheel during wheel rotation, (ii) having the other end extending generally radially outward from the wheel perimeter and facing in the direction from which the casing rotates, and (iii) shaped with a change in cross sectional area along at least a portion thereof, increasing in a direction from the said one end to the said other end;
(e) means to rotate the casing and wheel past the conduit;
(f) second openings in the cavities of the wheel spaced from the perimeter of the wheel;
(g) means blocking said second openings during a portion of the rotation of the wheel, said blocking means being fixed in a position relative to the conduit and located to block the second openings of the cavities during at least a portion of the movement of the cavities past the conduit; and
(h) means providing an outlet in communication with said second openings during a portion of the rotation of the wheel, said means providing an outlet being adjacent the blocking means and positioned to communicate with said second openings subsequent to the blocking of said second openings by the blocking means when the wheel is rotated in the said direction.

19. A mechanism as set forth in claim 18 wherein the conduit is formed of a plurality of channels that extend different radial distances from the perimeter of the wheel and wherein a channel extending a greater distance from the perimeter of the wheel is narrower and longer at the said other end of the conduit than is a channel extending a lesser distance from the perimeter and changes in cross sectional area to a greater extent.

20. In a liquid ring mechanism, the combination of:
(a) a casing defining a circular chamber constructed and arranged to contain a liquid;
(b) means mounting the casing for rotation about the central axis of the circular chamber;
(c) a compression wheel located within the chamber for rotation about a central axis parallel to or coincidental with the axis of the chamber, said wheel including a plurality of compression cavities;

(d) means to drive the wheel and the casing in the same direction and to form a rotating ring of liquid in the casing;

(e) said compression wheel being within the chamber and located to be outside the boundaries of the rotating liquid ring; and (f) a stationary deflector located within the chamber and positioned in part adjacent open portions of cavities of the compression wheel and in part to extend into the rotating liquid ring, said deflector including curved multiple channels through which liquid is conducted, and being constructed and arranged to deflect and conduct liquid from the rotating ring to compression cavities of the wheel during rotation of the casing and wheel, said channels being oriented adjacent the periphery of the compression wheel at an angle that provides a component of movement of the liquid in the direction of wheel rotation.

21. A mechanism as set forth in claim 20 wherein the deflector is shaped to provide a progressive increase in cross sectional area in a direction from the liquid ring toward the periphery of the compression wheel.

22. A liquid ring mechanism having an outer casing for containing and rotating liquid to form a ring, a compression wheel within the outer casing having cavities opening through the periphery of the wheel in which gas is trapped and compressed, and means to rotate the casing and wheel, wherein the improvement comprises locating the wheel in a position spaced from the liquid ring during operation of the mechanism, and a deflector within the casing, supported in a fixed position so that the casing and wheel rotate past the deflector, said deflector extending from adjacent the perimeter of the wheel to a location where it will intercept a portion of a rotating liquid ring in the casing and having channels to direct liquid from the ring to the wheel cavities.

23. A mechanism as set forth in claim 22 wherein at least a portion of the deflector is shaped to provide an increase in cross sectional area in a direction from where the deflector intercepts a portion of the liquid ring toward the perimeter of the wheel.

24. In a liquid ring mechanism, the combination of:
(a) a casing defining a circular chamber constructed and arranged to contain a liquid and to form a ring of the liquid when rotated about a central axis;

(b) liquid coupling means within the casing to impart motion of the casing to liquid therein;

(c) means supporting the casing for rotation about a central axis;

(d) a deflector at least partially within the casing and positioned to extend into a liquid ring when a ring is formed within the casing during rotation of the casing;

(e) means supporting the deflector in a fixed position within the casing so that the casing moves relative to the deflector;

(f) said deflector being curved and formed of a plurality of channels that extend to different depths in a ring of liquid when a ring of liquid is carried by the casing, to deflect liquid radially inward from said ring, and also having a cross sectional area that expands in the direction of flow of deflected liquid, that is, from a portion of the deflector that is positioned to intercept a liquid ring in the casing to a portion radially inward therefrom; and (g) a receiver for liquid adjacent a portion of the deflector radially inward from the portion that intercepts a liquid ring to receive liquid deflected from the ring.

25. The mechanism of claim 24 wherein the liquid receiver is a rotatable wheel having peripheral cavities.

26. In a liquid ring mechanism, the combination of:
(a) a casing defining a circular chamber constructed and arranged to contain a liquid;

(b) means mounting the casing for rotation about the central axis of the circular chamber;

(c) a compression wheel located within the chamber for rotation about a central axis parallel to or coincidental with the axis of the chamber, said wheel including a plurality of compression cavities;

(d) means to drive the wheel and the casing in the same direction and to form a rotating ring of liquid in the casing, (e) said compression wheel being within the chamber and located to be outside the boundaries of the rotating liquid ring;

(f) a first stationary deflector located within the chamber and positioned in part adjacent open portions of cavities of the compression wheel and in part to extend into the rotating liquid ring, said deflector being constructed and arranged to deflect and conduct liquid from the rotating ring to compression cavities of the wheel during rotation of the casing and wheel;

(g) a second deflector located within the chamber spaced from the first deflector, positioned in part adjacent open portions of cavities of the compression wheel and in part to extend into the rotating liquid ring, said deflector facing in the opposite direction from the first said stationary deflector relative to the direction of rotation of the casing and constructed and arranged to conduct liquid from the cavities of the wheel to the casing during rotation of the wheel; and (h) means to introduce combustible fuel to cavities of the wheel during rotation of the wheel.

References Cited

UNITED STATES PATENTS

| | | | |
|---|---|---|---|
| 922,595 | 5/1909 | Keller | 230—75 |
| 1,118,367 | 11/1914 | Pagel | 230—75 |
| 1,156,550 | 10/1915 | Peter | 230—75 |
| 1,755,430 | 4/1930 | Crosthwait | 230—75 |
| 1,945,759 | 6/1934 | Sim | 230—75 |
| 2,937,499 | 5/1960 | Klemt | 60—39.61 |

WILLIAM L. FREEH, Primary Examiner

U.S. Cl. X.R.

60—39.61

PO-1050
(5/69)

UNITED STATES PATENT OFFICE
CERTIFICATE OF CORRECTION

Patent No. 3,484,038      Dated December 16, 1969

Inventor(s) Cecil G. Martin

It is certified that error appears in the above-identified patent and that said Letters Patent are hereby corrected as shown below:

Column 1, line 38, "mcehanism" should be -- mechanism --

Column 7, line 41, "reflectors" should be -- deflectors --

Column 9, line 72, "wsehel" should be -- wheel --

Column 9, line 75, "successfully" should be -- successively --

Column 10, line 71, before "member" insert -- tubular --

Column 10, line 72, "two" should be -- Two --

Column 11, line 9, "195" should be -- 295 --

Column 13, line 8, after "up" -- one wall of -- should be inserted.

Column 13, line 8, delete "the other".

Column 13, line 30, "deescribed" should be -- described --

Column 14, line 47, "dishcarging" should be -- discharging --

Column 14, line 53, "of" (second occurence) should be cancelled.

Column 14, line 63, "out side" should be -- outside --

SIGNED AND
SEALED
AUG 18 1970

(SEAL)
Attest:

Edward M. Fletcher, Jr.
Attesting Officer

WILLIAM E. SCHUYLER, JR.
Commissioner of Patents